United States Patent
Ooba et al.

(10) Patent No.: US 11,731,693 B2
(45) Date of Patent: Aug. 22, 2023

(54) HUB UNIT WITH STEERING FUNCTION, STEERING SYSTEM, AND VEHICLE

(71) Applicant: NTN CORPORATION, Osaka (JP)

(72) Inventors: Hirokazu Ooba, Iwata (JP); Satoshi Utsunomiya, Iwata (JP); Norio Ishihara, Iwata (JP); Yusuke Ohata, Iwata (JP)

(73) Assignee: NTN CORPORATION, Osaka (JP)

( * ) Notice: Subject to any disclaimer, the term of this patent is extended or adjusted under 35 U.S.C. 154(b) by 135 days.

(21) Appl. No.: 17/032,467

(22) Filed: Sep. 25, 2020

(65) Prior Publication Data

US 2021/0009199 A1    Jan. 14, 2021

Related U.S. Application Data

(63) Continuation of application No. PCT/JP2019/012728, filed on Mar. 26, 2019.

(30) Foreign Application Priority Data

Mar. 27, 2018 (JP) ................... 2018-059174

(51) Int. Cl.
 *B62D 6/00* (2006.01)
 *B62D 5/04* (2006.01)

(52) U.S. Cl.
 CPC ........... *B62D 6/002* (2013.01); *B62D 5/0418* (2013.01)

(58) Field of Classification Search
 CPC ........ B62D 6/002; B62D 5/0418; B62D 7/06; B62D 7/18; F16C 19/364; F16C 19/381;
 (Continued)

(56) References Cited

U.S. PATENT DOCUMENTS 3,635,303 A * 1/1972 Hetmann ............... B60B 3/14
                                         180/370
6,364,426 B1 * 4/2002 Horne ................. B24B 19/28
                                         188/218 XL
(Continued)

FOREIGN PATENT DOCUMENTS

CN       102069843 A      5/2011
CN       102821985 A      12/2012
(Continued)

OTHER PUBLICATIONS

International Preliminary Report on Patentability and Written Opinion of the International Searching Authority dated Oct. 8, 2020 in International Patent Application No. PCT/JP2019/012728.
(Continued)

*Primary Examiner* — Nicholas Kiswanto
*Assistant Examiner* — Madison B Emmett

(57) ABSTRACT

Provided are a steering function-equipped hub unit that has a simple structure, high rigidity and a reduced size, a steering system, as well as a vehicle including the steering function-equipped hub unit. The steering function-equipped hub unit includes: a hub unit main body including a hub bearing supporting a wheel; a unit support member provided to a knuckle of a suspension device and rotatably supporting the hub unit main body about a turning axis extending in a vertical direction; and a steering actuator configured to rotationally drive the hub unit main body about the turning axis. The hub unit main body is supported by the unit support member through a preloaded rolling bearing.

6 Claims, 12 Drawing Sheets

(58) Field of Classification Search
CPC ....... B60B 35/003; B60B 35/18; B60B 35/14; B60G 2206/50; B60G 2500/40; B60G 2800/963
See application file for complete search history.

(56) References Cited

U.S. PATENT DOCUMENTS

| | | | |
|---|---|---|---|
| 7,717,203 B2 * | 5/2010 | Yoshino | B60K 17/046 903/910 |
| 8,297,631 B2 * | 10/2012 | Siebeneick | B60B 3/02 464/178 |
| 9,834,249 B2 | 12/2017 | Ishikawa et al. | |
| 10,023,228 B2 | 7/2018 | Ohba et al. | |
| 10,053,148 B2 | 8/2018 | Auden | |
| 10,293,636 B2 * | 5/2019 | Yang | B60B 35/003 |
| 10,668,950 B2 | 6/2020 | Kurita et al. | |
| 11,097,768 B2 | 8/2021 | Ooba et al. | |
| 2008/0167778 A1 | 7/2008 | Tsukasaki et al. | |
| 2008/0243339 A1 | 10/2008 | Nishimori et al. | |
| 2013/0153326 A1 | 6/2013 | Yamamoto et al. | |
| 2016/0023671 A1 | 8/2016 | Ohba et al. | |
| 2016/0280259 A1 | 9/2016 | Ishikawa et al. | |
| 2016/0362133 A1 | 12/2016 | Auden | |
| 2019/0016386 A1 | 1/2019 | Kurita et al. | |
| 2020/0122771 A1 | 4/2020 | Ooba et al. | |
| 2021/0001921 A1 | 1/2021 | Ishihara et al. | |

FOREIGN PATENT DOCUMENTS

| | | | |
|---|---|---|---|
| CN | 203094172 U | 7/2013 | |
| CN | 103895697 A | 7/2014 | |
| CN | 104908809 A | 9/2015 | |
| CN | 105579326 A | 5/2016 | |
| CN | 105658503 A | 6/2016 | |
| CN | 106240629 A | 12/2016 | |
| CN | 106335542 A | 1/2017 | |
| CN | 111867921 A | 10/2020 | |
| DE | 10 2012 206 337 A1 | 10/2013 | |
| EP | 2554408 A1 | 2/2013 | |
| EP | 3643584 A1 | 4/2020 | |
| EP | 3770040 A1 | 1/2021 | |
| JP | 2003011840 A * | 1/2003 | ............. B62D 5/006 |
| JP | 2005-138709 A | 6/2005 | |
| JP | 2005-349845 A | 12/2005 | |
| JP | 2006-175980 A | 7/2006 | |
| JP | 2007-62628 A | 3/2007 | |
| JP | 4230947 B | 2/2009 | |
| JP | 2009-113562 A | 5/2009 | |
| JP | 2009-226972 A | 10/2009 | |
| JP | 3158339 | 3/2010 | |
| JP | 2010-179678 A | 8/2010 | |
| JP | 2011-016429 A | 1/2011 | |
| JP | 2014-61744 A | 4/2014 | |
| JP | 5615094 B | 10/2014 | |
| JP | 2015-117005 A | 6/2015 | |
| JP | 2017-128151 A | 7/2017 | |
| JP | 2018-24284 A | 2/2018 | |
| JP | 2019-6226 | 1/2019 | |

OTHER PUBLICATIONS

International Preliminary Report on Patentability and Written Opinion of the International Searching Authority dated Oct. 8, 2020 in International Patent Application No. PCT/JP2019/012715.
Extended and Supplementary Search Report dated Nov. 22, 2021 in European Patent Application No. 19775319.7.
Extended and Supplementary Search Report dated Dec. 10, 2021 in European Patent Application No. 19778285.7.
Notice of Reasons for Refusal dated Jan. 4, 2022 in Japanese Patent Application No. 2018-059170.
International Search Report dated Jun. 4, 2019 in International Patent Application No. PCT/JP2019/012728.
International Search Report dated Jun. 25, 2019 in International Patent Application No. PCT/JP2019/012715.
U.S. Appl. No. 17/032,176, filed Sep. 25, 2020, Hirokazu Ooba, et al., NTN CORPORATION.
First Office Action dated Feb. 16, 2022 in Chinese Patent Application No. 201980022347.7.
First Office Action dated Feb. 25, 2022 in Chinese Patent Application No. 201980022150.3.
Notice of Reasons for Refusal dated Mar. 29, 2022 in Japanese Patent Application No. 2018-059174.
Chinese Office Action dated Sep. 20, 2022 in Chinese Patent Application No. 201980022150.3 (6 pages; 9 pages English translation).
Japanese Office Action dated Sep. 6, 2022 in Japanese Patent Application No. 2018-059174 (2 pages, 2 pages English translation).

* cited by examiner

LEFTWARD STEERING ANGLE OF 30 DEGREES

HUB UNIT WITH STEERING FUNCTION, STEERING SYSTEM, AND VEHICLE

CROSS REFERENCE TO THE RELATED APPLICATION

This application is a continuation application, under 35 U.S.C. § 111(a), of international application No. PCT/JP2019/012728, filed Mar. 26, 2019, which claims priority to Japanese patent application No. 2018-059174, filed Mar. 27, 2018, the entire disclosures of all of which are herein incorporated by reference as a part of this application.

BACKGROUND OF THE INVENTION

Field of the Invention

The present invention relates to a steering function-equipped hub unit, a steering system, and a vehicle including a steering function-equipped hub unit as well as to a technology for improving fuel economy and enhancing traveling stability and reliability of a vehicle.

Description of Related Art

General vehicles such as automobiles include a steering wheel mechanically connected to a steering device, the steering device having two ends connected to left and right wheels through tie rods. Therefore, turning angles of the left and right wheels are determined by an operation of the steering wheel in accordance with an initial setting. Known vehicle geometries include: (1) "parallel geometry" in which left and right wheels have the same turning angle; and (2) "Ackermann geometry" in which an inner wheel in turning is turned by a larger wheel angle than that of an outer wheel in turning so as to have a single center of turning.

In Ackermann geometry, a difference in turning angles of the left and right wheels is set so that the respective wheels turn about a single common point so as to smoothly turn the vehicle when turning in a low-speed range where a negligible centrifugal force acts on the vehicle. In contrast, when turning in a high-speed range where a centrifugal force is not negligible, parallel geometry is preferred to Ackermann geometry because it is desirable that the wheels generate a cornering force in a direction for counterbalancing the centrifugal force.

As mentioned above, since a steering device of a general vehicle is mechanically connected to wheels, the vehicle can usually assume only a single fixed steering geometry and is often configured in an intermediate geometry between Ackermann geometry and parallel geometry. In such a case, however, the turning angle of the outer wheel becomes excessively large in a low-speed range due to an insufficient difference in the turning angles of the left and right wheels, whereas the turning angle of the inner wheel becomes excessively large in a high-speed range. Thus, where there is unnecessarily unbalanced distribution of a wheel lateral force between the inner and outer wheels, travel resistance may be deteriorated, leading to worsening of fuel economy and early wear of the wheels. Further, there is another problem that the inner and outer wheels cannot not be effectively used, causing deterioration in smooth cornering.

Patent Document 1

A steer-by-wire system (device) as described in Patent Document 1 includes a steering angle sensor for detecting a steering angle of a steering wheel and a torque sensor for detecting a steering reaction force actually applied to a steering shaft and operates an actuator of a steering device using signals from these sensors so as to steer left and right wheels by the single steering device. In such a case, the steering device disposed in a chassis front part includes a large motor, increasing the size of the system as a whole. The chassis front part has a limited space because many other mechanical parts such as an engine and a transmission are disposed therein.

Patent Document 2

In a steering system for operating steering actuators capable of independently steering respective wheels of a front-wheel or rear-wheel system, the steering actuators are fixed to a chassis, and thus there is a difficulty in securing a space as is the case in Patent Document 1. Further, the system allows the angles of the left and right wheels to be independently and separately controlled in an arbitrary manner depending on driving conditions. However, it is difficult to adjust the wheel angles to certain angles, as the wheel angles greatly change in cases where the vehicle is displaced downward (e.g., during cornering) or upward with respect to the tires because the steering actuators are fixed to the chassis, and tie rods connecting the steering actuators and the wheels have a fixed length.

Patent Document 3

Since a hub bearing is supported in a cantilever manner with respect to a turning shaft, the rigidity may be reduced, and a steering geometry may be changed due to generation of turning acceleration G Where a speed reducer is provided on the turning shaft, the entire mechanism including a motor would have an increased size, which makes it difficult to dispose the entire mechanism in an inner peripheral part of a wheel. In addition, where a speed reducer having a large reduction ratio is provided, responsiveness would be decreased.

A conventional mechanism having a steering function for each wheel as described above can reduce a space in a chassis front part which is required for a steering device. However, since such mechanisms are intended to change toe angles or camber angles of wheels of a vehicle, multiple motors and speed reduction mechanisms are needed, making the structure complicated. Also, it is difficult to secure rigidity, and, in order to secure rigidity, each of the mechanisms as a whole would necessarily have an increased size and an increased weight. In addition, where a king pin axis coincides with a turning axis, constituting components are disposed rearward of a hub unit (on the vehicle body side), increasing the size and weight of the entire structure.

Patent Document 4

These actuators would necessarily always be subjected to a load from wheels during driving, and where the structure includes a gear such as a worm gear, the load reversely inputted from the wheel side is received by the gear part. Where road conditions are bad, an abrupt impact load may be applied to the wheels, and an abnormality may occur in the gear which is under the load.

RELATED DOCUMENT

Patent Document

[Patent Document 1] JP Laid-open Patent Publication No. 2005-349845

[Patent Document 2] JP Patent No. 4230947
[Patent Document 3] DE 102012206337 A1
[Patent Document 4] JP Patent No. 5615094

SUMMARY OF THE INVENTION

Vehicles having an all-wheel drive (abbreviated as AWD) layout, an FF layout, or an FR layout typically include an engine and a transmission in a front part, and there is a conflict between spaces required for different components in a chassis inner space in the front part. Thus, it is required to reduce the sizes of the respective components. Since a steering device for steering the front wheels is also disposed in a similar position, it is difficult to include a large complicated mechanism. Also, where a steering wheel is mechanically connected to the steering device and then to the wheels, vibration caused to the tires while the vehicle drives on a rough road such as a gravel road or a stone-paved road is transferred to unpleasant vibration to a driver.

In order to change a toe angle or a camber angle of a wheel using a mechanism disposed in a wheel body so as to leave a sufficient space on the chassis side, the mechanism needs to have a complicated structure, which leads to an increased number of constituting components and reduced rigidity.

An object of the present invention is to provide a steering function-equipped hub unit that has a simple structure, high rigidity and a reduced size, a steering system, as well as a vehicle including such a steering function-equipped hub unit.

A steering function-equipped hub unit of the present invention is a steering function-equipped hub unit for a steer-by-wire system in which a steering input section and a wheel are mechanically disconnected, the steer-by-wire system being configured to steer the wheel, the steering function-equipped hub unit including:
  a hub unit main body including a hub bearing supporting the wheel;
  a unit support member provided to a chassis frame component of a suspension device and rotatably supporting the hub unit main body about a turning axis extending in a vertical direction; and
  a steering actuator configured to rotationally drive the hub unit main body about the turning axis, wherein
  the hub unit main body is supported by the unit support member through a preloaded rolling bearing. The preload may be applied to the rolling bearing, for example, such that an initial preload is maintained even where the weight of the vehicle is applied on the hub unit.

According to this configuration, the hub unit main body including the hub bearing for supporting the wheel can be arbitrarily rotated about the turning axis by driving the steering actuator. Thus, each wheel can be independently steered, and the toe angle of each wheel can be arbitrarily changed depending on driving conditions of the vehicle. The hub unit main body is supported by the unit support member through the preloaded rolling bearing such that the steering function-equipped hub unit can secure rigidity as a steering device.

Where this configuration is applied to front wheels, the wheels that serve as the front wheels are steered in accordance with an operation of the steering wheel by a driver. Also, each of the wheels can be independently steered. This configuration may also be applied to rear wheels in a front-wheel drive vehicle. In such a case, the steering function of the rear wheels can reduce a turning radius of the vehicle and thereby enhance small-turn performance. Since it is not necessary to secure a large steering angle for the rear wheels, the size of the steering actuator can be reduced. In either case, the hub unit main body can be arbitrarily rotated about the turning axis by the steering actuator such that, for example, the toe angles of the left and right wheels can be independently changed depending on driving conditions of the vehicle. Provision of the steering mechanism in the hub unit makes it possible to leave room in the chassis front part.

It is also possible to change the difference in the turning angles of the left and right wheels in accordance with information (such as vehicle velocity, steering wheel angle, and lateral force) obtained from sensors of the vehicle during turning so as to change the steering geometries during driving. For example, the steering geometries may be changed so as to assume parallel geometry when turning in a high-speed range and Ackermann geometry when turning in a low-speed range. Thus, the steering angles of the wheels can be arbitrarily changed during driving so that the vehicle can have improved motion performance as well as achieve high stability and reliability in driving.

By suitably changing the steering angles of the left and right turning wheels, it is also possible to reduce a turning radius of the vehicle in turning and to improve small-turn performance. Further, even when the vehicle drives straight, the toe angles may be adjusted depending on circumstances so as to perform adjustment for, e.g., ensuring traveling stability without deteriorating fuel economy. In addition, since the steering input section such as the steering wheel is not mechanically connected to the wheels, unpleasant vibration to a driver can be blocked when driving roads such as a gravel road or a stone-paved road. It is also possible to transmit only necessary information for a driver from, for example, a reaction force actuator of the steering input section to the driver.

A steering system of the present invention includes:
  a steering function-equipped hub unit of the present invention having the above feature; and
  a control device configured to control a turning actuator of the steering function-equipped hub unit, wherein
  the control device includes a control section configured to output a current command signal in response to a given steering angle command signal and an actuator drive control section configured to output a driving current in response to the current command signal inputted from the control section to drive and control the turning actuator.

According to this configuration, the control section is configured to output a current command signal in response to a given steering angle command signal. The actuator drive control section is configured to output a current in response to the current command signal inputted from the control section to drive and control the turning actuator. Therefore, it is possible to arbitrarily change the steering angles of the wheels in addition to the steering in accordance with an operation of the steering input section by a driver.

A vehicle of a first invention according to the present invention may include left and right front wheels each including a steering function-equipped hub unit having the above feature according to the present invention. A vehicle of a second invention according to the present invention may include left and right rear wheels each including a steering function-equipped hub unit having the above feature according to the present invention. A vehicle of a third invention according to the present invention may include left and right front wheels and left and right rear wheels each including a steering function-equipped hub unit having the above feature according to the present invention.

Therefore, the above-described effects of the steering function-equipped hub unit of the present invention can be obtained. The front wheels generally serve as turning wheels. Where the steering function-equipped hub units of the present invention are applied to turning wheels, the toe angles can be effectively adjusted during driving. In contrast, the rear wheels generally serve as non-turning wheels. Where the hub units are applied to non-turning wheels, a minimum turning radius when driving at low speed can be reduced by slightly steering the non-turning wheels. Where the steering function-equipped hub units are applied to front and rear wheels, the toe angles can be effectively adjusted during driving, and a minimum turning radius when driving at low speed can be reduced.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views. In the figures.

DESCRIPTION OF THE EMBODIMENTS

First Embodiment

A steering function-equipped hub unit according to a first embodiment of the present invention will be described with reference to FIG. 1 to FIG. 10. The steering function-equipped hub unit may be applied to a steer-by-wire system in which a steering input section (i.e., a steering wheel) and a wheel are mechanically disconnected from each other, the system being configured to steer the wheel.

Schematic Structure of Steering Function-Equipped Hub Unit 1

Figure 1:
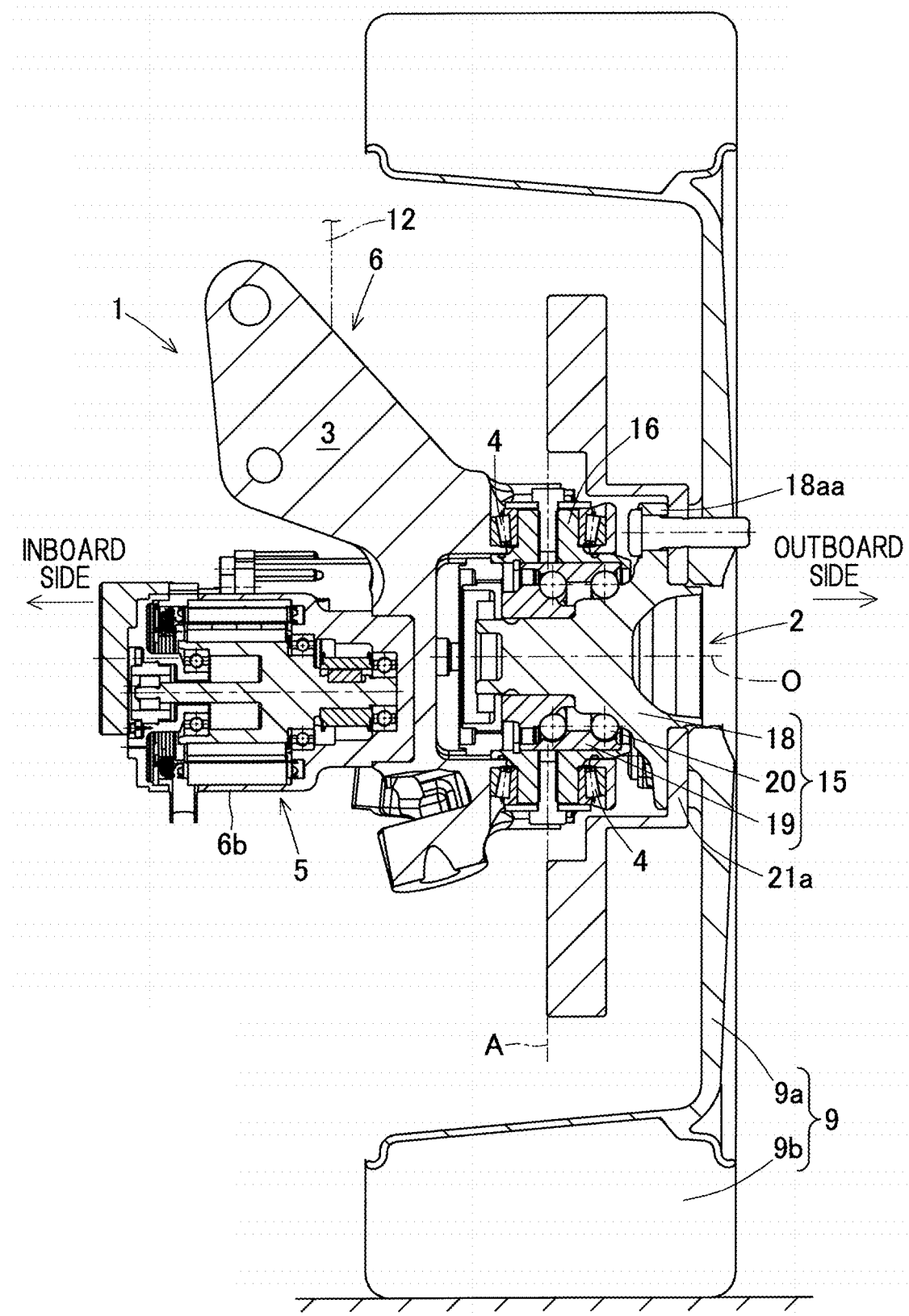
FIG. 1 is a longitudinal sectional view illustrating a steering function-equipped hub unit according to a first embodiment of the present invention and surrounding features thereof.

As shown in FIG. 1, the steering function-equipped hub unit 1 includes a hub unit main body 2, a unit support member 3, a rolling bearing 4 that is a rotation-permitting support component, and a steering actuator 5. The unit support member 3 is integrally provided to a knuckle 6 that is a chassis frame component. In this example, the knuckle 6 is fixed so as not to rotate in a steering direction and is attached to a typical suspension device 12. Therefore, the wheel 9 of the vehicle including the steering function-equipped hub unit 1 is steered only by an operation of the steering actuator 5. The steering function-equipped hub unit 1 is used to independently change the angle of each of the left and right wheels 9 in addition to the steering of the wheels 9 performed by the operation of the steering wheel.

Figure 4:
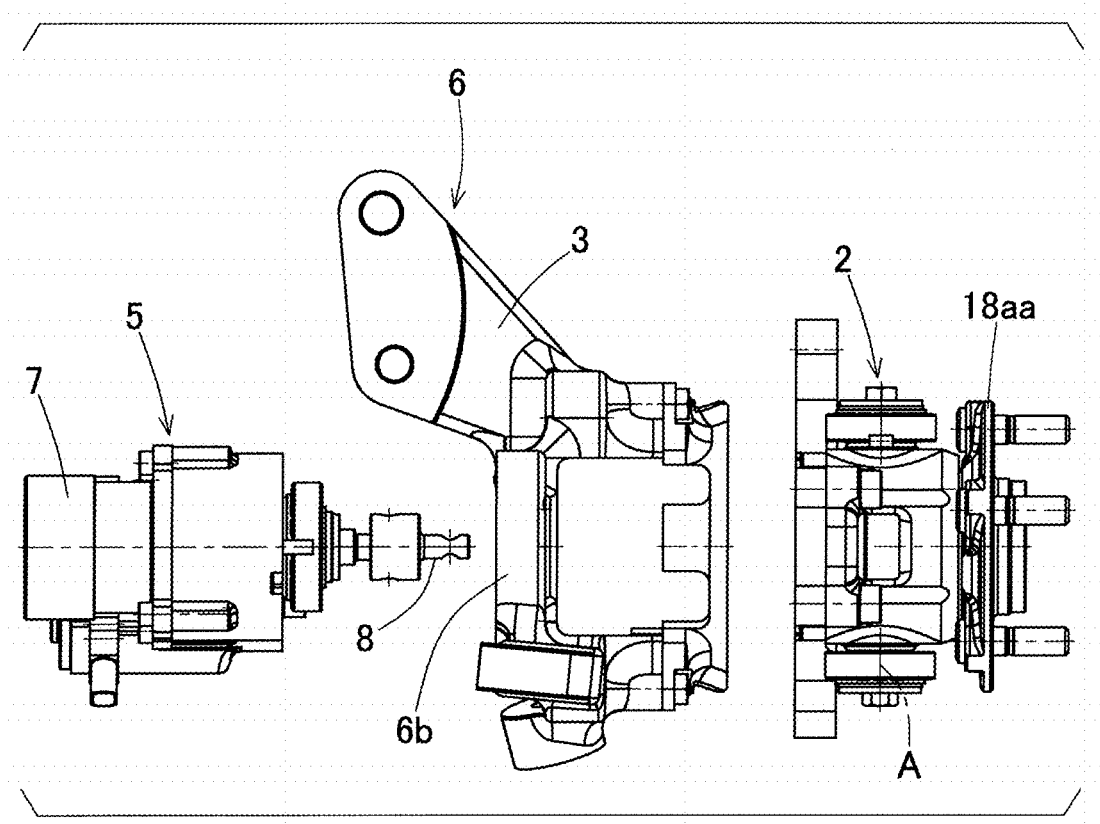
FIG. 4 is an exploded front view of the steering function-equipped hub unit.
Figure 5:
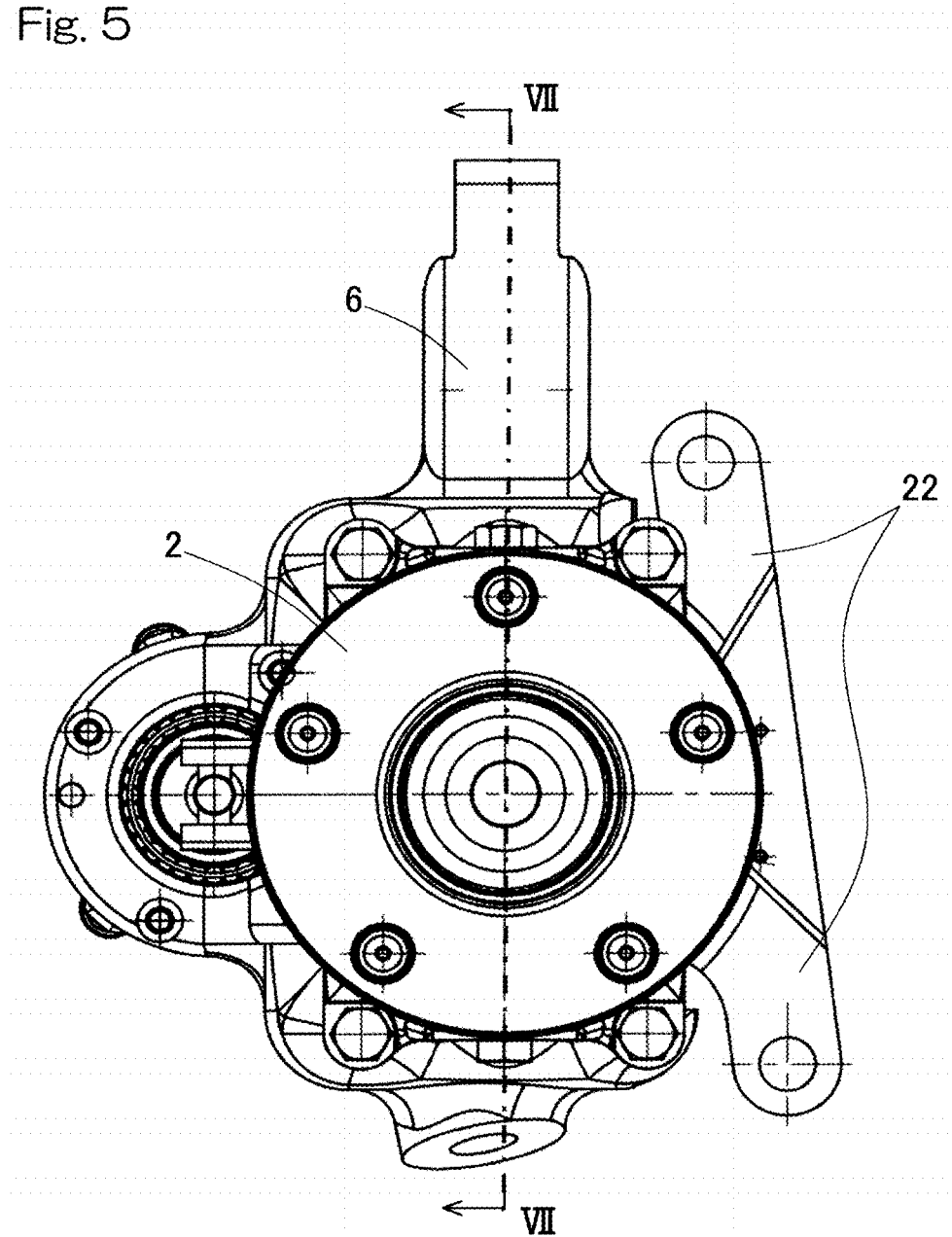
FIG. 5 is a side view of the steering function-equipped hub unit.

As shown in FIG. 4, an actuator main body 7 of the steering actuator 5 is disposed on an inboard side of the unit support member 3, and the hub unit main body 2 is disposed on an outboard side of the unit support member 3. The "outboard side" refers to an outer side in a widthwise direction of a vehicle in a state where the steering function-equipped hub unit 1 (FIG. 1) is mounted to the vehicle, and the "inboard side" refers to an inner side in the widthwise direction of the vehicle.

Figure 2:
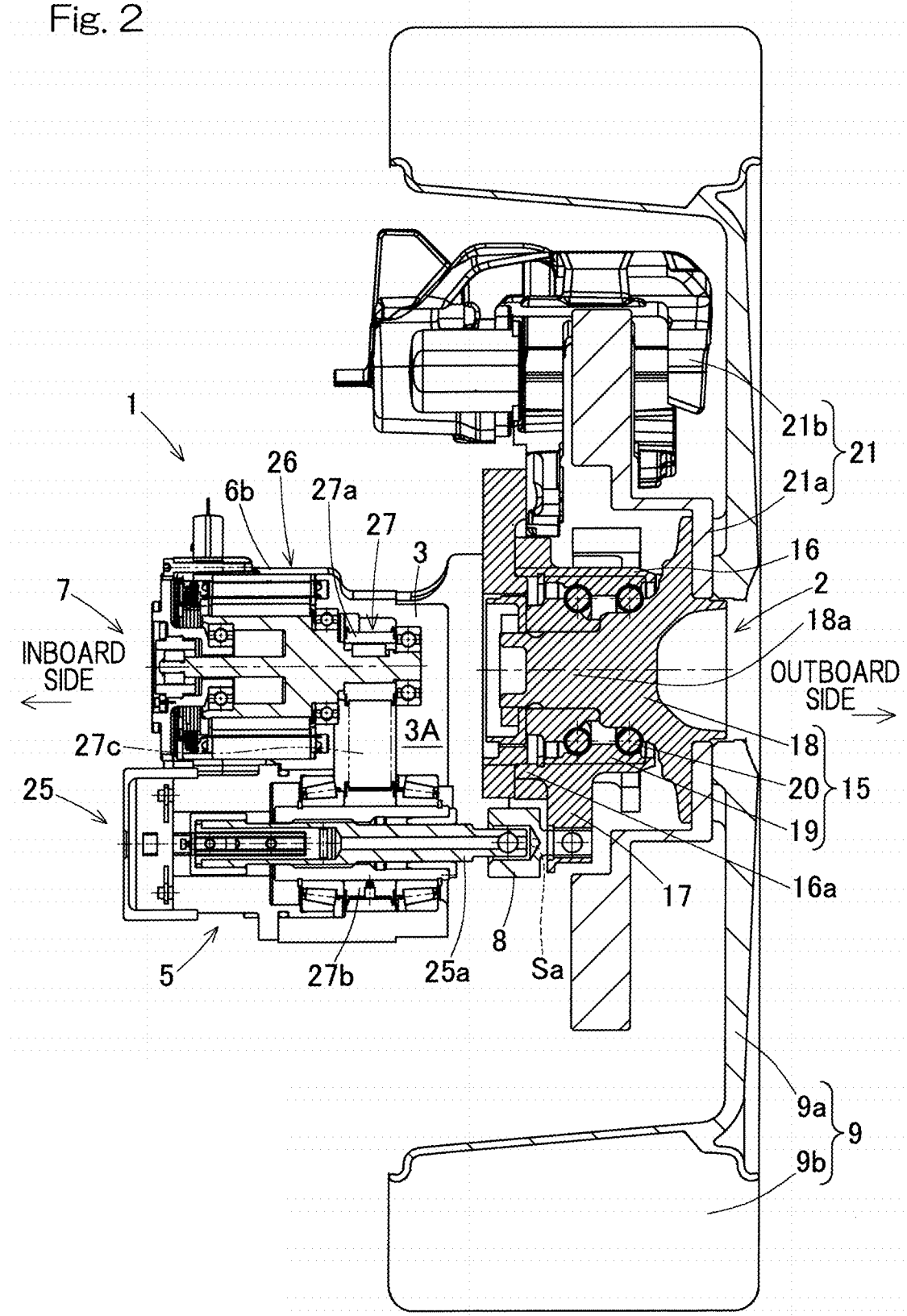
FIG. 2 is a horizontal sectional view illustrating the steering function-equipped hub unit and the surrounding features thereof.
Figure 3:
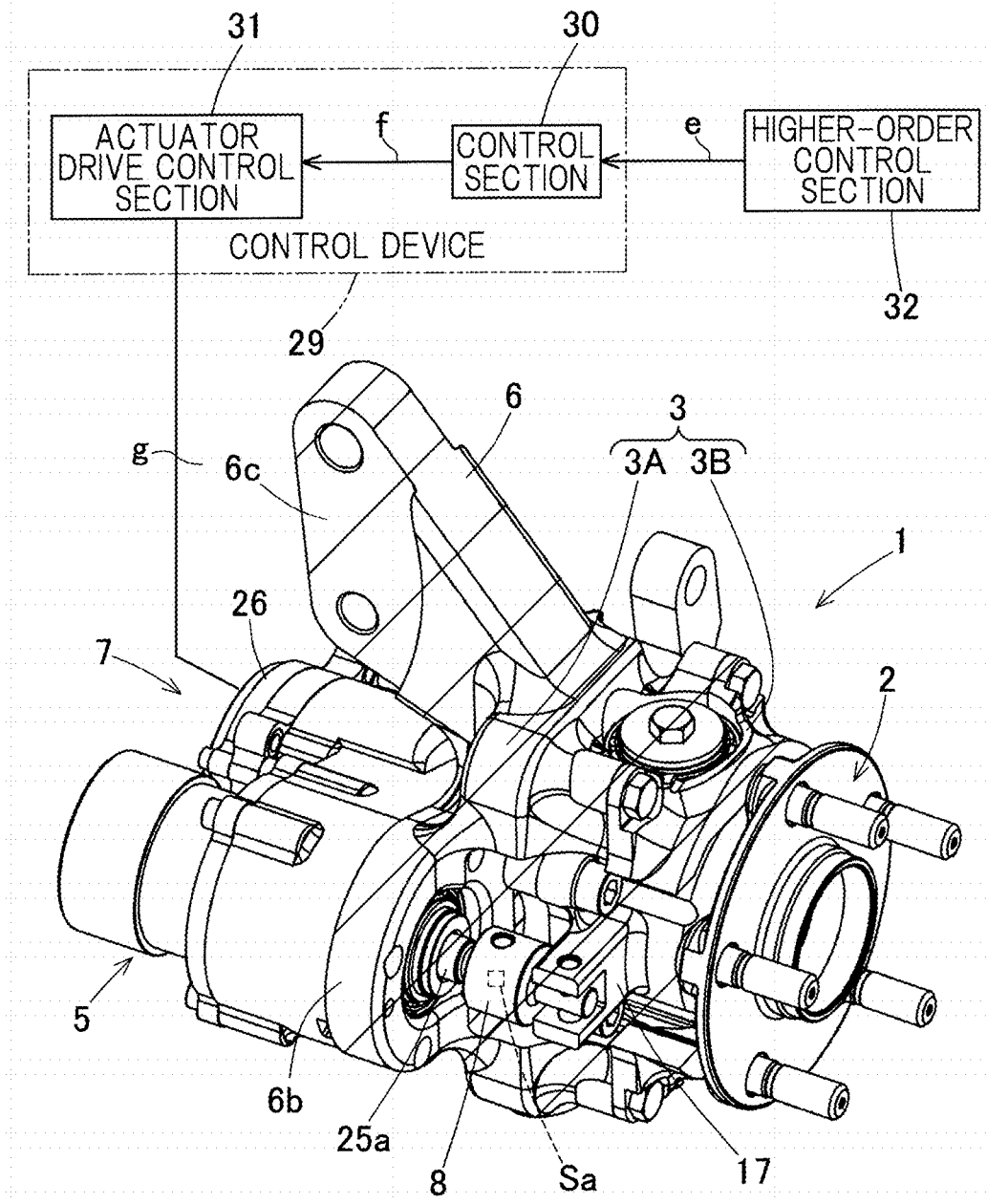
FIG. 3 is a perspective view showing an appearance of the steering function-equipped hub unit.

As shown in FIG. 2 and FIG. 3, the hub unit main body 2 and the actuator main body 7 are connected by a joint part 8. The joint part 8 is typically attached with a non-illustrated boot for protection against water and dust. The joint part 8 is provided with a reaction force sensor Sa which will be described later.

As shown in FIG. 1, the hub unit main body 2 is supported by the unit support member 3 through the rotation-permitting support components 4, 4 provided above and below the hub unit main body such that the hub unit main body is rotatable about the turning axis A extending in a vertical direction. The turning axis A is different from a rotation axis O of the wheel 9. The wheel 9 includes a wheel body 9a and a tire 9b.

Installation Location of Steering Function-Equipped Hub Unit 1

Figure 10:
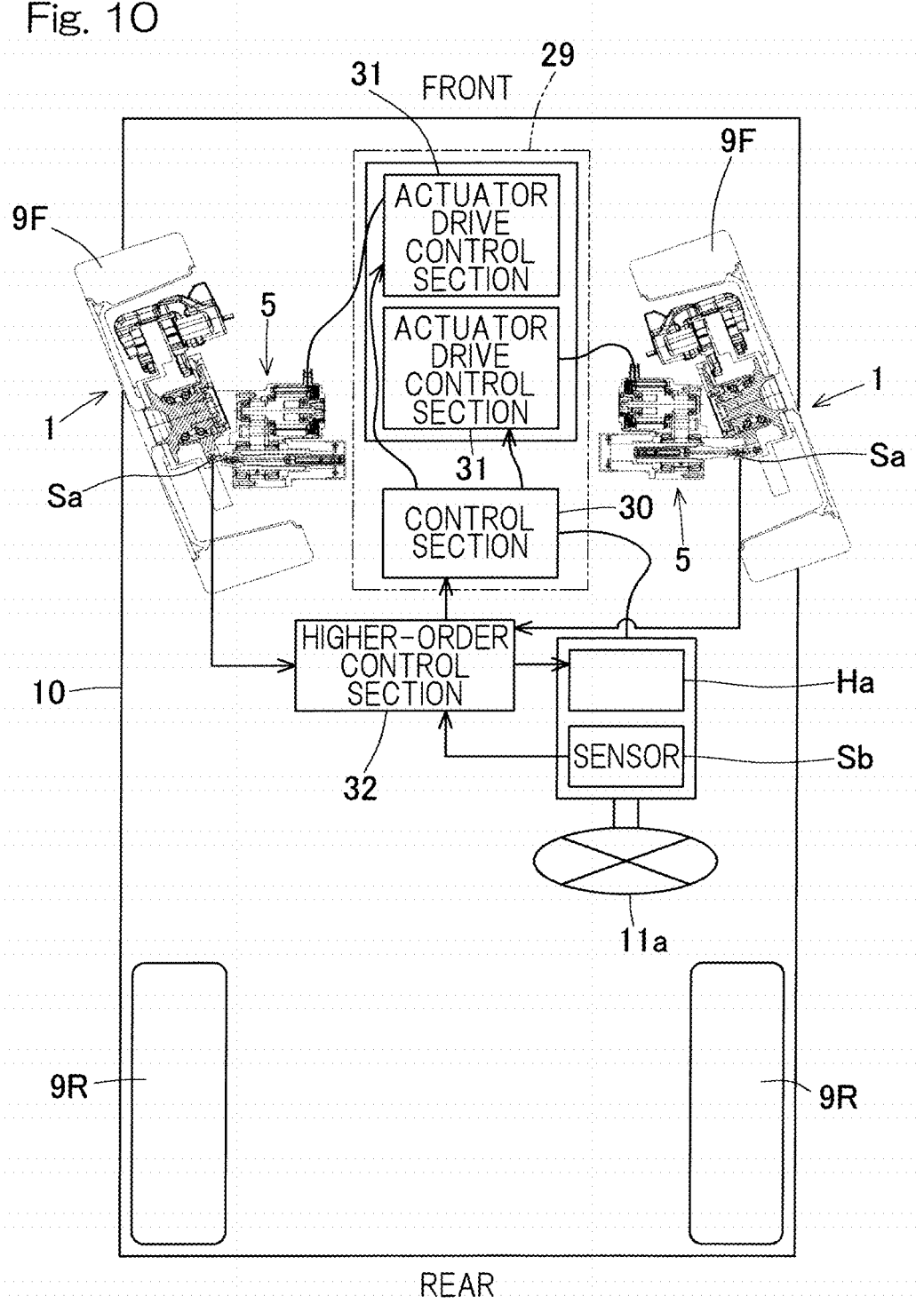
FIG. 10 is a schematic plan view of an example of a vehicle including the steering function-equipped hub unit.

As shown in FIG. 3 and FIG. 10, the steering function-equipped hub unit 1 is mounted to the knuckle 6 of the suspension device 12 (FIG. 1) and is provided to each of left and right front wheels 9F, 9F that serve as turning wheels of the vehicle 10. Although the suspension device 12 (FIG. 1) is, for example, a strut type suspension mechanism in which a shock absorber is directly fixed to the knuckle 6, it may be of other type such as a multi-link type suspension mechanism.

In the steer-by-wire system, the steering function-equipped hub unit 1 and the steering input section 11a that is the steering wheel are not mechanically connected to each other and are electrically connected only through electrical signals. The steering input section 11a is provided with a sensor Sb configured to detect and output a rotation angle and an angular speed obtained in accordance with an operation of the steering wheel by a driver. The steer-by-wire system operates the steering actuators 5, 5 in response to an electrical signal outputted from the sensor Sb so as to independently and arbitrarily steer the left and right front wheels 9F, 9F depending on driving conditions of the vehicle 10.

The sensor Sb may be a rotation angle detection module (such as a resolver) for detecting a rotation angle. The angular speed can be calculated by, e.g., differentiating the rotation angle detected by the rotation angle detection module. The steer-by-wire system includes a reaction force sensor Sa configured to detect a reaction force from a tire and a reaction force actuator Ha configured to transmit only necessary information for a driver (steering reaction force) from the reaction force detected by the reaction force sensor Sa to the steering input section 11a.

The reaction force sensor Sa may be a sensor for detecting a reaction force acting on the joint part 8, such as a load cell or a load sensor. In this case, the reaction force sensor Sa detects an axial force applied to a linear output part 25a when the linear output part 25a of the steering actuator 5 advances and retracts, and converts the axial force into an electrical signal. The relationship between the electrical signal obtained by the reaction force sensor Sa and the steering reaction force generated by the reaction force actuator Ha may be, for example, defined by a map or an operation formula. Therefore, the steer-by-wire system makes it possible to provide a steering sensation according to the vehicle situation. The steer-by-wire system may operate the steering actuators 5, 5 in accordance with a command of, e.g., a non-illustrated automated driving device or drive assist device, instead of the operation of the steering wheel by a driver.

Hub Unit Main Body 2

Figure 7:
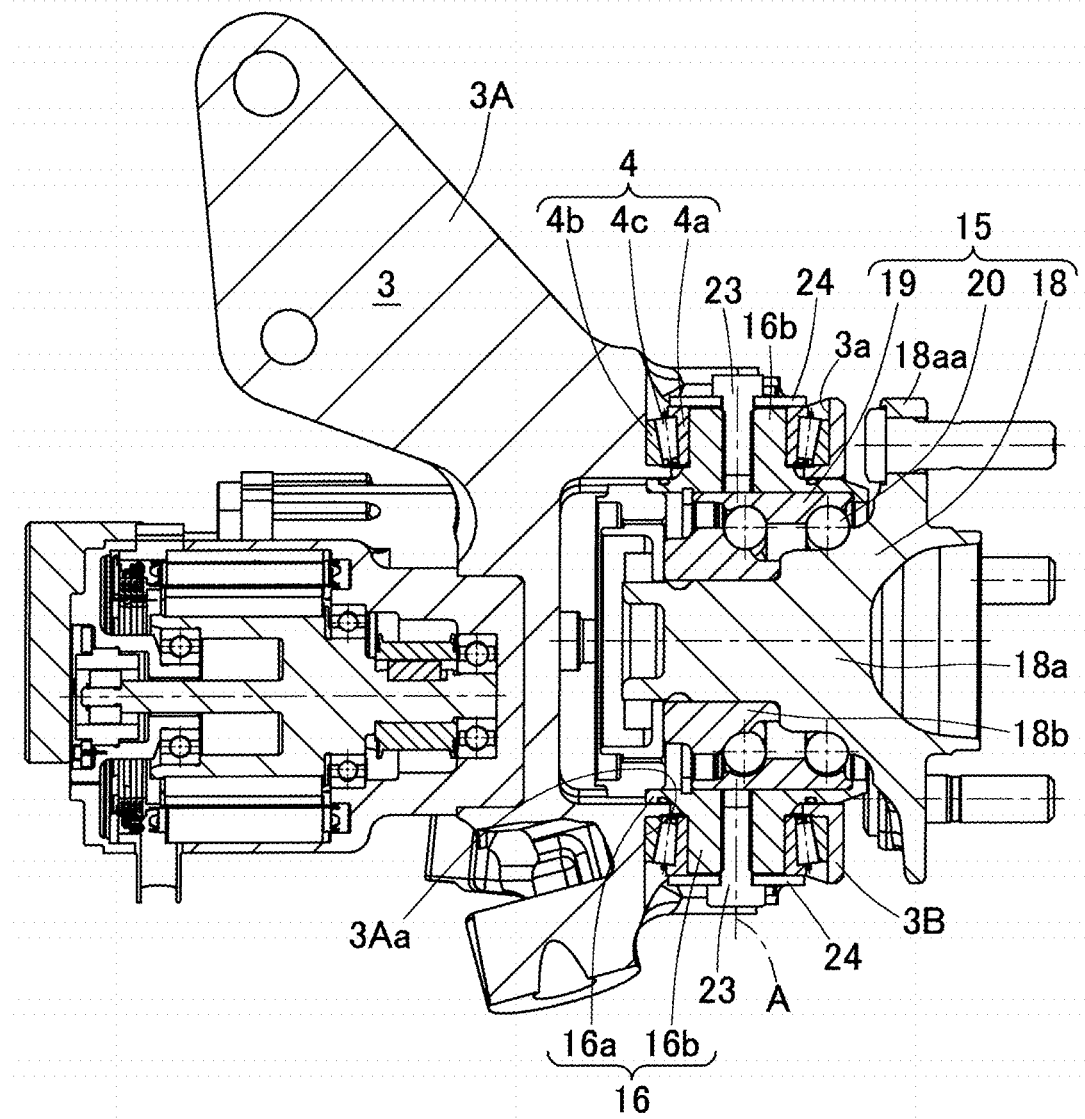
FIG. 7 is a sectional view along line VII-VII in FIG. 5.

As shown in FIG. 1 and FIG. 7, the hub unit main body 2 includes a hub bearing 15 for supporting the wheel 9, an outer ring 16, and an arm part 17 (FIG. 3) that is a steering-force receiving part described later. The hub bearing 15 includes an inner race 18, an outer race 19, and rolling elements 20 (such as balls) interposed between the inner and outer races 18, 19. The hub bearing serves to connect a member on a vehicle body side and the wheel 9.

In the illustrated example, the hub bearing 15 is an angular ball bearing in which the outer race 19 serves as a stationary ring, the inner race 18 serves as a rotary ring, and the rolling elements 20 are arranged in double rows. The inner race 18 includes: a hub axle part 18a that has a hub flange 18aa and forms a raceway surface on the outboard side; and an inner ring part 18b that forms a raceway surface on the inboard side. The wheel body 9a of the wheel 9 is fixed to the hub flange 18aa by a bolt such that the wheel body 9a is overlapped with a brake rotor 21a. The inner race 18 rotates about a rotation axis O.

The outer ring 16 includes: an annular part 16a fitted to an outer peripheral surface of the outer race 19; and attachment shaft parts 16b, 16b each having a trunnion shaft shape, the attachment shaft parts being provided so as to protrude upwardly and downwardly from an outer periphery of the annular part 16a. Each of the attachment shaft parts 16b is provided so as to be coaxial with the turning axis A. As shown in FIG. 2, the brake 21 includes the brake rotor 21a and a brake caliper 21b. The brake caliper 21b is mounted on two brake caliper attachment parts 22 (FIG. 5) that are provided above and below and are integrally formed with the outer race 19 so as to protrude in an arm-like manner.

Rotation-Permitting Support Component 4 and Unit Support Member 3

As shown in FIG. 7, each of the rolling bearings 4 that serve as the rotation-permitting support components may be a tapered rolling bearing. In this example, a tapered roller bearing is used as the rolling bearing (rotation-permitting support component) 4. The rolling bearing 4 includes an inner race 4a fitted to the outer periphery of the attachment shaft part 16b, an outer race 4b fitted to the unit support member 3, and a plurality of rolling elements 4c interposed between the inner and outer races 4a, 4b.

The unit support member 3 includes a unit support member main body 3A and a unit support member joint body 3B. The unit support member main body 3A has an outboard side end to which the unit support member joint body 3B having a substantially ring shape is removably fixed. The unit support member joint body 3B has an inboard side surface having upper and lower portions each formed with a fitting hole forming part 3a having a partially concaved spherical shape.

Figure 6:
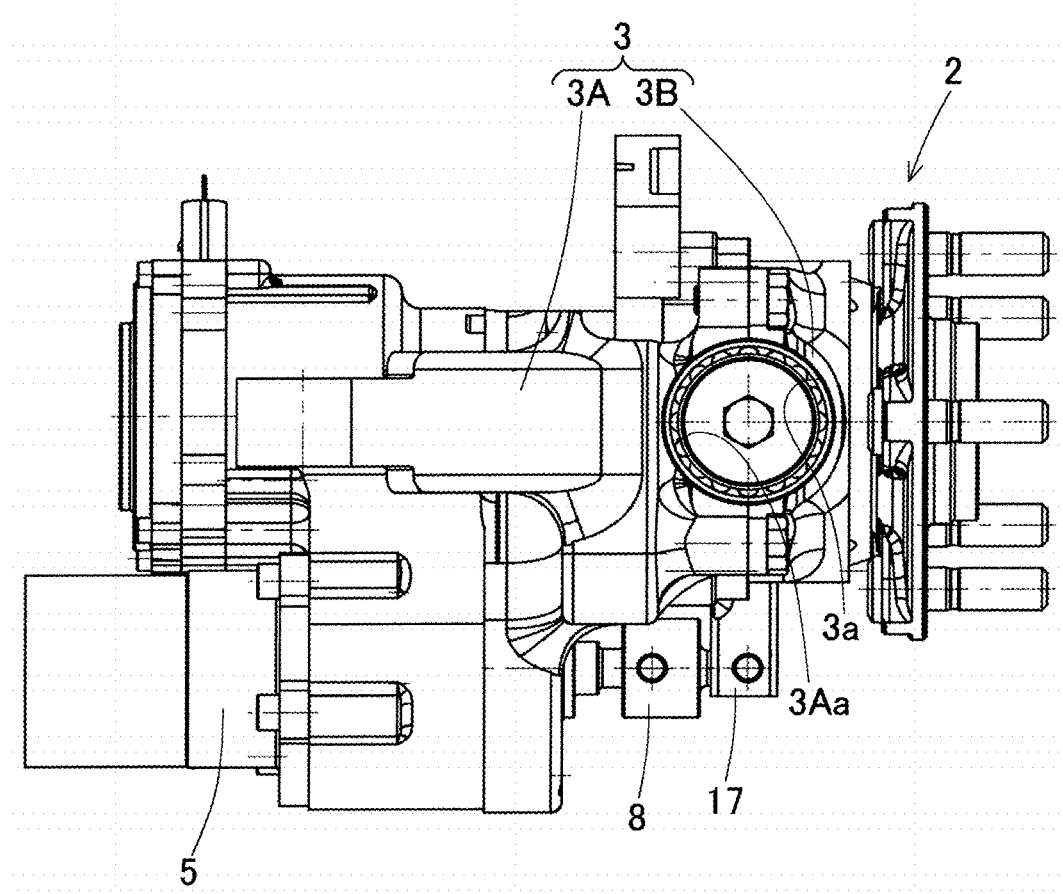
FIG. 6 is a plan view of the steering function-equipped hub unit.

As shown in FIG. 6 and FIG. 7, the unit support member main body 3A has the outboard side end having upper and lower portions each formed with a fitting hole forming part 3Aa having a partially concaved spherical shape. As shown in FIG. 3, the unit support member joint body 3B is fixed to the outboard side end of the unit support member main body 3A such that the respective fitting hole forming parts 3a, 3Aa (FIG. 6) are put together in the upper and lower portions to define fitting holes each having a complete circumference. As shown in FIG. 7, the outer race 4b is fitted into the fitting hole. It should be noted that in FIG. 3, the unit support member 3 is indicated by chain lines.

As shown in FIG. 7, each of the attachment shaft parts 16b of the outer ring 16 is formed with an internal thread portion extending in a radial direction, and a bolt 23 is screwed into the internal thread portion. Each of the rolling bearings 4 is preloaded by applying a pressing force to an end face of the inner race 4a by the bolt 23 screwed into the internal thread portion, with a pressing member 24 having a disk shape interposed on the end face of the inner race 4a. This makes it possible to improve rigidity of each of the rolling bearings 4. An initial load is set so as not to be released even where the weight of the vehicle acts on the hub unit. Therefore, the steering function-equipped hub unit can secure rigidity as a steering device. It should be noted that the rolling bearings 4 are not limited to tapered roller bearings, and they may be angular ball bearings depending on use conditions such as maximum load. Even in such a case, a preload can be applied in the same way as described above.

Figure 8:
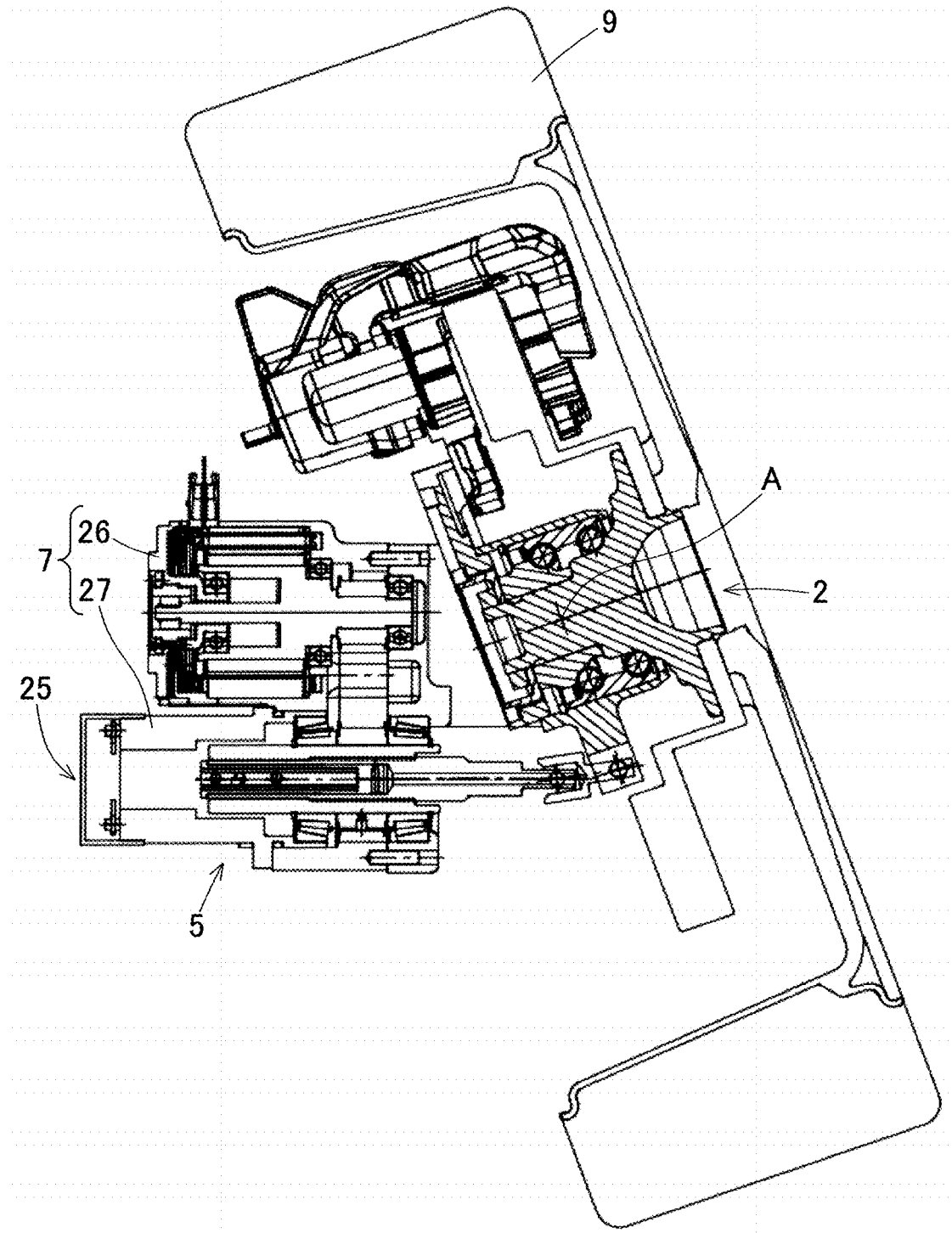
FIG. 8 is a horizontal sectional view of the steering function-equipped hub unit that is turned to the left.
Figure 9:
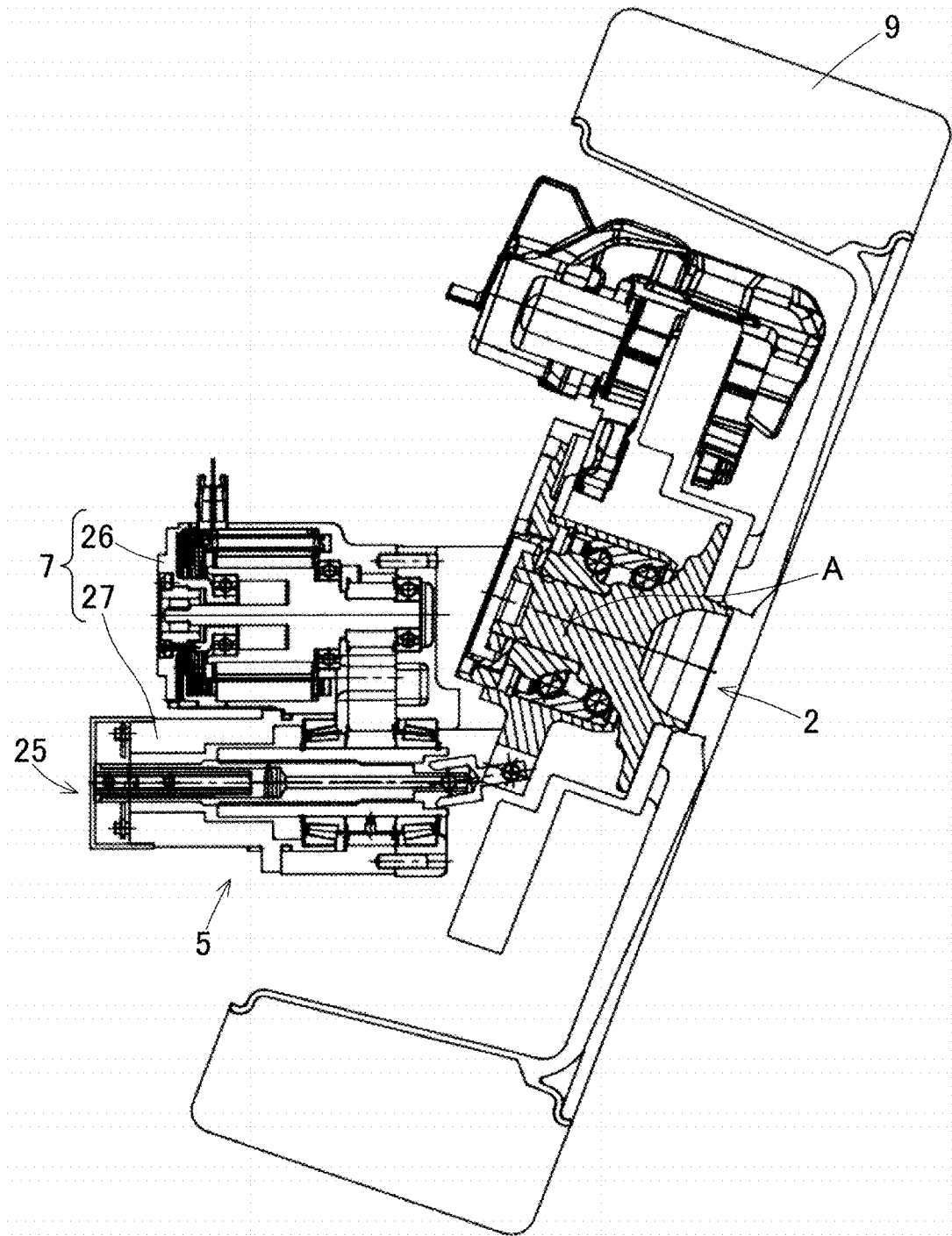
FIG. 9 is a horizontal sectional view of the steering function-equipped hub unit that is turned to the right.

As shown in FIG. 2, the arm part 17 serves as a point of application of a steering force applied to the outer race 19 of the hub bearing 15 and is integrally provided as a part of the outer periphery of the outer race 19. The arm part 17 is rotatably coupled to the linear output part 25a of the steering actuator 5 through the joint part 8. This allows the linear output part 25a of the steering actuator 5 to advance/retreat so that the hub unit main body 2 is caused to rotate, i.e., to turn about the turning axis A (FIG. 1). FIG. 8 shows the right wheel 9 when turning to the left, and FIG. 9 shows the right wheel 9 when turning to the right. The steering angle of the wheel 9 is changed by moving a linear motion mechanism 25 of the steering actuator 5, which will be described later, by a motor 26 in a reciprocating manner.

Steering Actuator 5

As shown in FIG. 3, the steering actuator 5 includes an actuator main body 7 configured to rotationally drive the hub unit main body 2 about the turning axis A (FIG. 1). As shown in FIG. 2, the actuator main body 7 includes the motor 26, a speed reducer 27 configured to reduce the speed of rotation of the motor 26, and the linear motion mechanism 25 configured to convert a forward/reverse rotation output from the speed reducer 27 into the reciprocating linear motion of the linear output part 25a. The motor 26 is, for example, a permanent magnet synchronous motor, or may be a direct current motor or an induction motor. The speed reducer 27 may sometimes be omitted.

The speed reducer 27 may be a winding-type transmission mechanism, such as a belt transmission mechanism, or a gear train. In the example of FIG. 2, a belt transmission mechanism is used. The speed reducer 27 includes a driving pulley 27a, a driven pulley 27b, and a belt 27c. The driving pulley 27a is coupled to a motor shaft of the motor 26, and the driven pulley 27b is disposed in the linear motion mechanism 25. The driven pulley 27b is disposed parallel to the motor shaft. A driving force of the motor 26 is transmitted from the driving pulley 27a to the driven pulley 27b through the belt 27c. The driving pulley 27a, the driven pulley 27b and the belt 27c form the speed reducer 27 of a winding type.

The linear motion mechanism 25 may be a feed screw mechanism, such as a sliding screw and a ball screw, or a rack and pinion mechanism. In this example, a feed screw mechanism with a trapezoid sliding screw is used. Since the linear motion mechanism 25 includes the feed screw mechanism with the trapezoid sliding screw, the effects of preventing a reverse input from the tire 9b can be enhanced. The actuator main body 7 including the motor 26, the speed reducer 27 and the linear motion mechanism 25 is assembled as a semi-assembled product and is removably mounted to a casing 6b by e.g. a bolt. It is also possible to use a mechanism that directly transmits a driving force from the motor 26 to the linear motion mechanism 25 without involving a speed reducer.

The casing 6b is integrally formed with the unit support member main body 3A as a part of the unit support member 3. The casing 6b is formed in a bottomed cylindrical shape and includes a motor receiving part for supporting the motor 26 and a linear motion mechanism receiving part for supporting the linear motion mechanism 25. The motor receiving part is formed with a fitting hole for supporting the motor 26 at a predetermined position inside the casing. The linear motion mechanism receiving part is formed with a fitting hole for supporting the linear motion mechanism 25 at a predetermined position inside the casing and a through-hole for allowing the linear output part 25a to advance and retreat.

As shown in FIG. 3, the unit support member main body 3A includes: the casing 6b; and a shock absorber attachment part 6c that serves as an attachment part for a shock absorber. The shock absorber attachment part 6c is also integrally formed with the unit support member main body 3A. The shock absorber attachment part 6c is formed in a protruding manner on an upper portion of an outer surface part of the unit support member main body 3A.

Effects and Advantages

Figure 11:
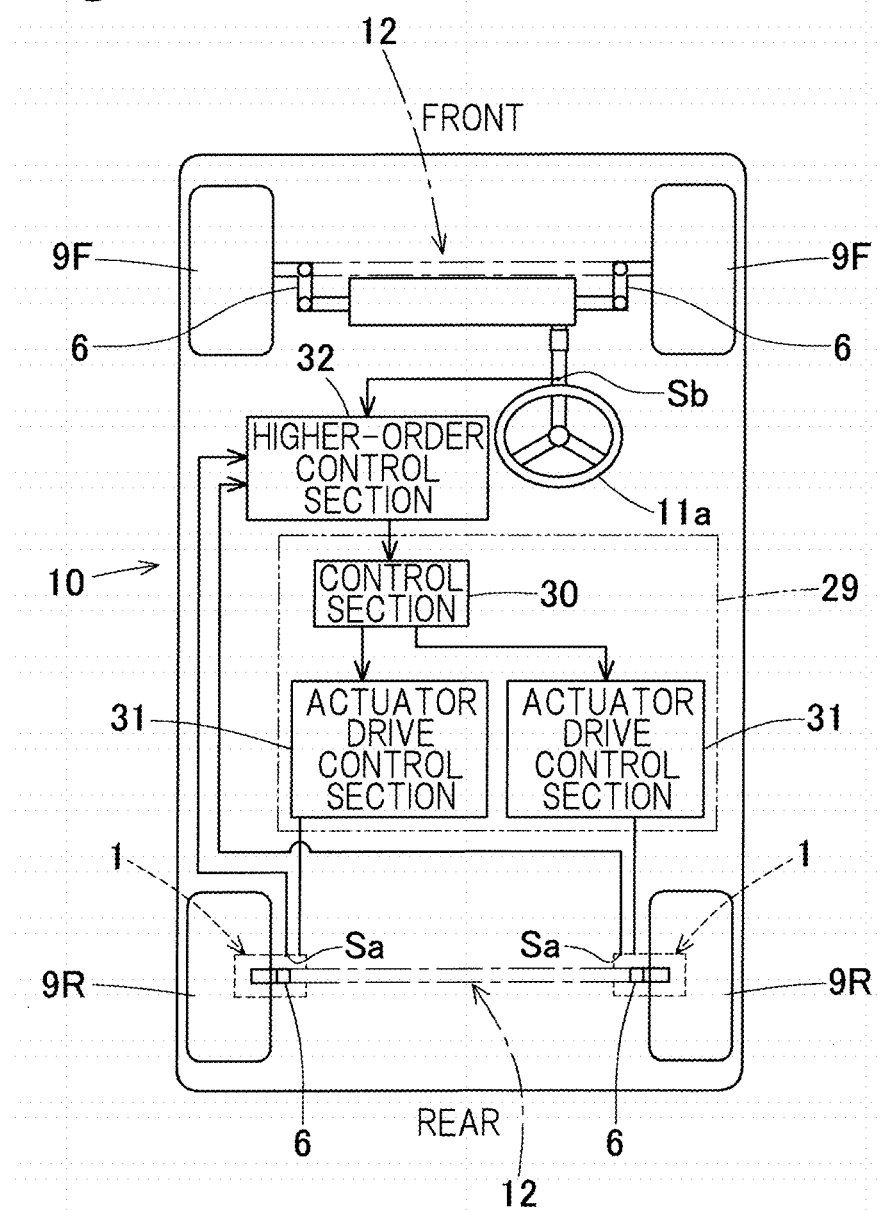
FIG. 11 is a schematic plan view of another example of a vehicle including the steering function-equipped hub unit.

According to the above-described steering function-equipped hub unit 1, the hub unit main body 2 including the hub bearing 15 for supporting the wheel 9 can be arbitrarily rotated about the turning axis A by driving the steering actuator 5. This makes it possible to independently steer each wheel and to arbitrarily change the toe angles of the wheels 9 depending on driving conditions of the vehicle 10. The hub unit main body 2 is supported by the unit support member 3 through the preloaded rolling bearings 4, 4, such that the steering function-equipped hub unit 1 can secure rigidity as a steering device.

Where this configuration is applied to the front wheels 9F, the wheels 9 that are the front wheels 9F are steered by an operation of the steering wheel by a driver. This also makes it possible to independently steer each wheel. This configuration may also be applied to rear wheels 9R (FIG. 11) in a front-wheel drive vehicle. In such a case, the steering function of the rear wheels 9R (FIG. 11) can reduce a turning radius of the vehicle and thereby enhance small-turn performance. Since the rear wheels 9R (FIG. 11) do not need to have a large steering angle, the size of the steering actuator can be reduced.

In either case, the hub unit main body 2 can be arbitrarily rotated about the turning axis A by the steering actuator 5 such that, for example, the toe angle of each of the left and right wheels 9 can be independently changed depending on driving conditions of the vehicle 10. Provision of the steering mechanism in the hub unit 1 makes it possible to leave room in the chassis front part. Further, since the steering actuator 5 is disposed in the hub unit 1, the steering device does not need to be disposed in a widthwise direction of the vehicle, providing an ample space inside the vehicle.

It is also possible to change a difference in the turning angles of the left and right wheels 9, 9 in accordance with information (such as vehicle velocity, steering wheel angle, and lateral force) obtained from sensors of the vehicle 10 during turning so as to change the steering geometries during driving. For example, the steering geometries may be changed so as to assume parallel geometry when turning in a high-speed range and Ackermann geometry when turning in a low-speed range. Thus, the steering angles of the wheels 9 can be arbitrarily changed during driving so that the vehicle 10 can have improved motion performance as well as achieve high stability and reliability in driving.

By suitably changing the steering angles of the left and right turning wheels, it is also possible to reduce a turning radius of the vehicle 10 in turning and to improve small-turn performance. Further, even when the vehicle drives straight, the toe angles may be adjusted depending on circumstances so as to perform adjustment for, e.g., ensuring traveling stability without deteriorating fuel economy. In addition, since the steering input section 11a such as the steering wheel is not mechanically connected to the wheels 9, unpleasant vibration to a driver can be blocked when driving roads such as a gravel road or a stone-paved road. It is also possible to transmit only necessary information for a driver from, for example, a reaction force actuator Ha of the steering input section 11a to the driver.

Steering System

As shown in FIG. 3, the steering system includes the steering function-equipped hub unit 1 and a control device 29 configured to control the steering actuator 5 of the steering function-equipped hub unit 1. The control device 29 includes a control section 30 and an actuator drive control section 31. As a driver manipulates the steering angles of the wheels through the steering wheel, a higher-order control section 32 outputs a steering angle command signal e, which is calculated for the left and right wheels in accordance with the operation angle of the steering wheel and in consideration of the vehicle conditions. The control section 30 outputs a current command signal f in response to the given steering angle command signal e from the higher-order control section 32.

The higher-order control section 32 is a superordinate control section of the control section 30, and the higher-order control section 32 may be, for example, an electronic control section (vehicle control section, or abbreviated as VCU) configured to perform general control of a vehicle. The actuator drive control section 31 outputs a driving current g in response to the current command signal f inputted from the control section 30 to drive and control the steering actuator 5. The actuator drive control section 31 controls power to be supplied to coils of the motor 26. The actuator drive control section 31 may, for example, form a half-bridge circuit using a non-illustrated switching element and perform PWM control for setting a motor application voltage in accordance with an ON-OFF duty ratio of the switching element. This makes it possible to change the angle of the hub unit main body 2 relative to the unit support member 3 to change the angle of the wheel. This makes it possible to adjust the magnitude of the toe angles depending on circumstances even when the vehicle drives straight. Thus, motion performance and fuel economy can be improved.

Figure 12:
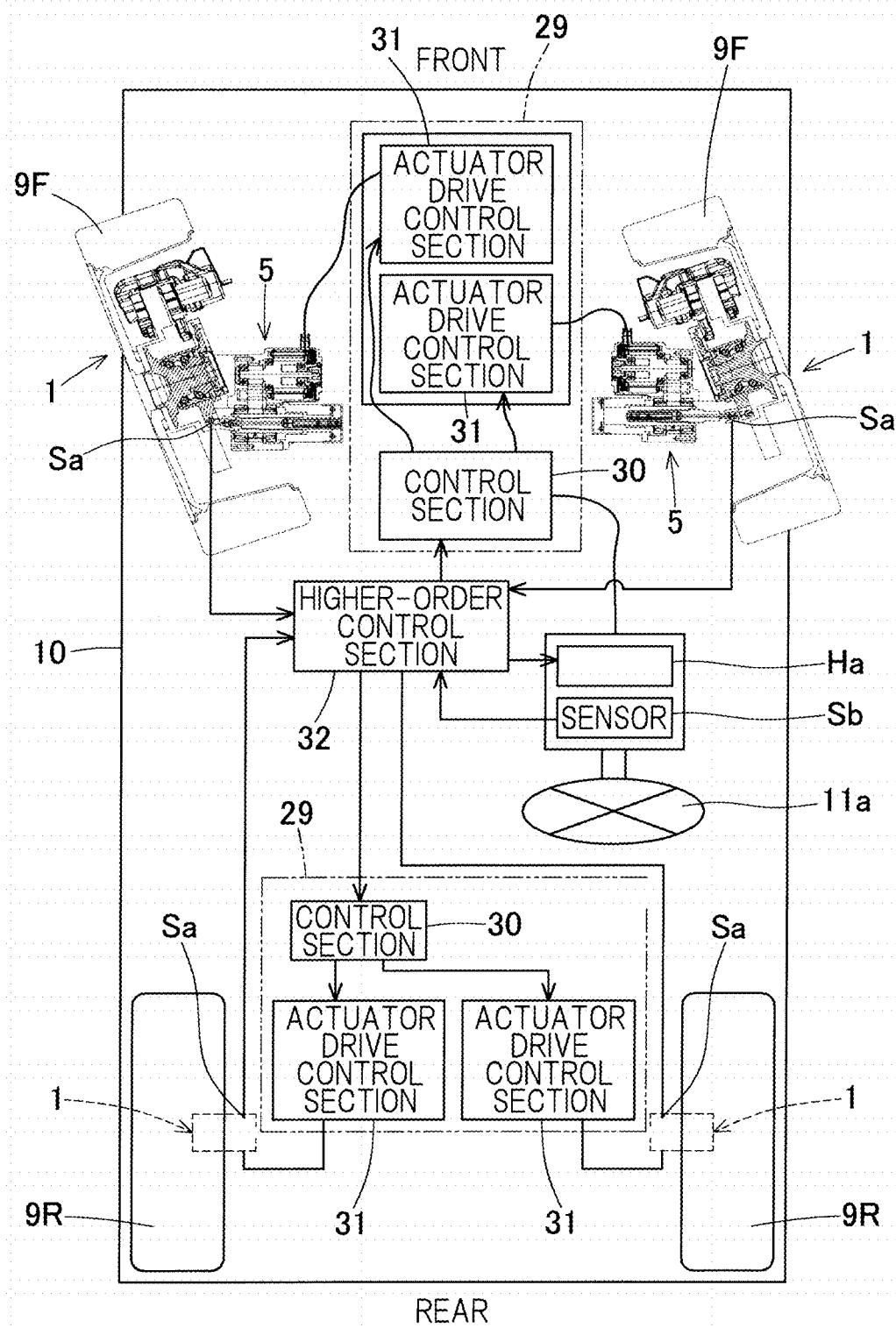
FIG. 12 is a schematic plan view of yet another example of a vehicle including the steering function-equipped hub unit.

As shown in FIG. 12, the steering function-equipped hub unit 1 may be provided to each of left and right front wheels 9F, 9F and left and right rear wheels 9R, 9R. In this case, the toe angles can be effectively adjusted during driving, and a minimum turning radius when driving at low speed can be reduced.

Although the preferred embodiments of the present invention have been described with reference to the drawings, those skilled in the art who read the specification would easily arrive at various changes and modifications without departing from the scope of the invention. Accordingly, such changes and modifications are included within the scope of the present invention.

REFERENCE NUMERALS

- 1 . . . Steering function-equipped hub unit
- 2 . . . Hub unit main body
- 3 . . . Unit support member
- 4 . . . Rolling bearing (rotation-permitting support component)
- 5 . . . Steering actuator
- 6 . . . Knuckle (chassis frame component)
- 9 . . . Wheel
- 9F . . . Front wheel
- 9R . . . Rear wheel
- 10 . . . Vehicle
- 11a . . . Steering input section
- 12 . . . Suspension device
- 15 . . . Hub bearing
- 29 . . . Control device
- 30 . . . Control section
- 31 . . . Actuator drive control section

What is claimed is:

1. A steering function-equipped hub unit for a steer-by-wire system in which a steering input section and a wheel are mechanically disconnected from each other, the steer-by-wire system being configured to steer the wheel, the steering function-equipped hub unit comprising:
    a hub unit main body including a hub bearing rotatably supporting the wheel and attachment shaft parts each having a trunnion shaft shape, the attachment shaft parts protruding upwardly and downwardly from an outer periphery of the hub bearing;
    a unit support member provided to a chassis frame component of a suspension device and rotatably supporting the hub unit main body about a turning axis extending in a vertical direction through the attachment shaft parts; and
    a steering actuator configured to rotationally drive the hub unit main body about the turning axis,
    wherein
        the upper and lower attachment shaft parts of the hub unit main body are supported by the unit support member through preloaded rolling bearings,
        the attachment shaft parts are arranged on an outer diametric side with respect to an outer race of the hub bearing,
        each of the attachment shaft parts is formed with an internal thread portion extending in a radial direction of the wheel, and
        a bolt screwed into the internal thread portion applies a pressing force to an end face of an inner race of a corresponding one of the preloaded rolling bearings through a pressing member interposed between the bolt and the end face of the inner race to preload the corresponding one of the preloaded rolling bearings.

2. A steering system comprising:
    the steering function-equipped hub unit as claimed in claim 1; and
    a control device configured to control a turning actuator of the steering function-equipped hub unit, wherein
    the control device includes a control section configured to output a current command signal in response to a given steering angle command signal and an actuator drive control section configured to output a driving current in response to the current command signal inputted from the control section to drive and control the turning actuator.

3. A vehicle comprising left and right front wheels each including the steering function-equipped hub unit as claimed in claim 1.

4. A vehicle comprising left and right rear wheels each including the steering function-equipped hub unit as claimed in claim 1.

5. A vehicle comprising left and right front wheels and left and right rear wheels each including the steering function-equipped hub unit as claimed in claim 1.

6. The steering function-equipped hub unit as claimed in claim 1, comprising: a reaction force sensor configured to detect a reaction force from a tire; and
    a reaction force actuator for generating a steering reaction force in relation to an electrical signal obtained by the reaction force sensor.

* * * * *